March 17, 1931.      W. KRATT      1,796,795
PITCH PIPE
Filed April 14, 1928
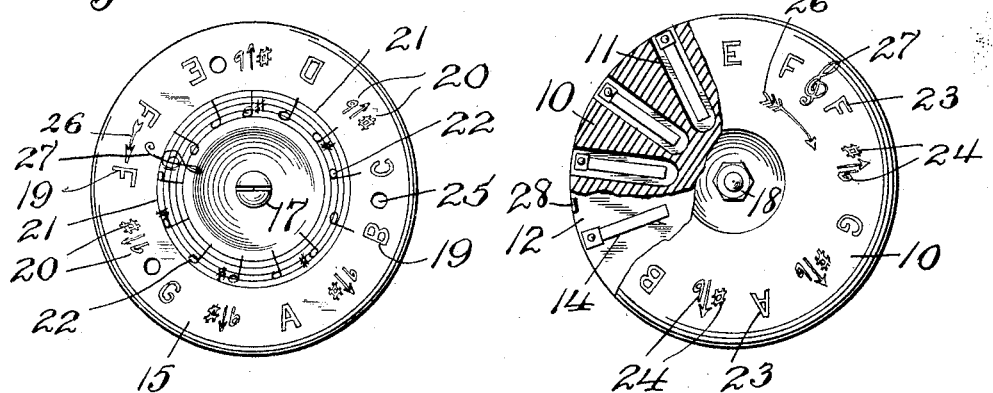
INVENTOR
William Kratt,
BY
Wm H Caufield.
ATTORNEY Patented Mar. 17, 1931

1,796,795

UNITED STATES PATENT OFFICE

WILLIAM KRATT, OF NEW BRUNSWICK, NEW JERSEY

PITCH PIPE

Application filed April 14, 1928. Serial No. 269,917.

This invention relates to an improved pitch pipe which is designed to give a clear firm tone which is desirable not only in tuning instruments but in the wider field in which these pipes are used and that is in educational directions, the pitch pipe being made with a bottom portion on which the part containing the reeds is secured by a lighter and more resonant plate which is also provided with openings through which the air that is blown in through air channels can escape.

The invention is also designed to provide a pitch pipe which is provided with instructions made in the form of indicia placed opposite the openings of the respective reeds, the indicia consisting of the letter of a note and usually the corresponding musical sign.

The pitch pipe is made circular and the parts are formed as concentric circles with the notes placed thereon opposite their respective openings.

Another feature of the invention is the arrangement of the letters and other matter so that they read in their regular order with the outside rim of the pitch pipe as the bottom and on the reverse side with the outside rim as the top. In other words when picking up the pitch pipe and in rotating it if a letter is used for finding the air passage and instructing or for other reasons the pitch pipe is handled so that the bottom is toward the user, the letter in view is still upright by reason of the reversal of these letters on the opposite sides of the pipe.

The invention is illustrated in the accompanying drawings in which Figure 1 is a top view of a pitch pipe made according to my invention. Figure 2 is a bottom view thereof partly broken away to show construction of the bottom plate and also to disclose a part of the central disc. Figure 3 is a view half in elevation and half in section and Figure 4 is a fragmentary view in perspective of one edge of the pipe looking from the top. Figure 5 is a similar view of the same part of the pipe looking from the bottom to indicate how turning over the pitch pipe does not cause any loss of time in re-locating the desired opening.

The pitch pipe consists of a bottom plate 10 which is usually made of substantial thickness and is not resonant or vibratory, phenolic condensation product and similar material being used for this plate which is provided with lateral grooves 11 forming channels for air which are closed at the top by a central disc 12. This is usually of metal and has openings 13 to correspond with the channels 11 and on these openings are secured the reeds 14. The top plate 15 is of sheet metal and has a flanged rim 16 to which engages the edge of the disc 12. In the centre is a means for securing all these parts together and I show a screw 17 and a nut 18 for this purpose, the plates being recessed or hollowed out so that the head of the screw and the nut are beneath the surface of the pipe and they do not form projections to interfere with the smooth surface of the pipe.

In the form shown I illustrate a pitch pipe to include an octave of the chromatic scale and the indicia is placed opposite each opening. In the illustration I show letters 19 of the various notes and indicia at 20 indicating the sharps and flats of the adjacent notes and on the top plate I also provide the bars 21 with the representations of the notes 22 in their proper places. The letters 19 on the top plate are arranged with the bottoms of the letters next to the outside rim. In other words they read upright looking from the edge. On the bottom of the pitch pipe similar letters 23 and the signs of the sharps and flats at 24 are arranged with the bottom of these markings toward the centre of the pitch pipe, that is, reversed from the position on the top plate. The greater advantage in this arrangement is that if the pitch pipe is held in the hand and is held rather low as shown in Figure 4, the letter is upright and can be quickly recognized, whereas, if it is held out in front of the person as in Figure 5 the corresponding letter on the bottom plate is in the same ready position for prompt reading. This feature makes it easy to find the notes and does not detract a person who is instructing or otherwise engaged in educational or instructive duties.

The openings 25 in the top plate 15 allows the escape of air blown into the device to sound the readings as the space above the reading is a single chamber and the openings permit of an easier blowing of the pipe and does not interfere with the sound board effect of the thin top plate.

Various modifications may be made in the construction of the parts without departing from the scope of the invention.

In order to make it easy and convenient to recognize the starting point and finish of a scale there is a special mark placed between the high and low note of the scale, as the arrow 26 placed to point toward the upward rim of the scale. To make it still easier to know at a glance where the scale starts there is placed the sign of the clef 27 at the beginning of the chromatic scale. This feature is made the same on the top and bottom of the pitch pipe.

The marks 24 for the half-notes are arranged so that on an upward reading the sharp sign is first encountered and on a downward reading the flat sign is first encountered and these are defined by the dividing sign in the form of an arrow pointing to the proper air opening on the side of the pitch pipe.

The full scale need not be shown in the case of pipes for violin with four strings or mandolin with four, guitar with six and other instruments in which cases only the required number are provided. In any event the preference is for a circular pitch-pipe.

To facilitate the assembly of the parts and prevent their relative positions being changed I provide a lip 28 on the top plate 15 which lip extends into a notch in plate 13 and into a notch in bottom plate 10 and the lip thus acts as a key.

I claim:—

1. A pitch pipe comprising a circular bottom plate with radial grooves therein, extending to the outer edge thereof, a top plate of sheet metal with a flanged rim, a disc resting on the bottom plate and engaged by the edge of the top plate, a central pin securing the parts together, reeds in the disc and arranged in line with the grooves the disc having a notch in its edge and the bottom plate having a notch in its edge, and a lip on the top plate fitting into the notches to guide and hold the parts in proper relative positions.

2. A pitch pipe of disk-like form having mouth openings in its edge and indicia on the top and bottom faces of the pipe, the indicia on the top arranged upright relative to said edge and the indicia on the bottom being reversed relative to said edge and in opposite alignment with those on the top.

In testimony whereof I affix my signature.

WM. KRATT.